Sept. 8, 1964

E. J. CHUPUNGCO ETAL  3,148,051
PROCESS FOR THE PRODUCTION OF METALLIC COPPER
POWDER AND AMMONIUM SULFATE FROM
COPPER SULFATE SOLUTIONS
Filed Aug. 3, 1962

INVENTORS
ESTANISLAO J. CHUPUNGCO
JOAQUIN A. QUINTOS III
WILLIAM S. GODINEZ
BY
ATTORNEYS

United States Patent Office 3,148,051
Patented Sept. 8, 1964

3,148,051
PROCESS FOR THE PRODUCTION OF METALLIC COPPER POWDER AND AMMONIUM SULFATE FROM COPPER SULFATE SOLUTIONS
Estanislao J. Chupungco, Joaquin A. Quintos III, and William S. Godinez, Toledo City, Cebu, Philippines, assignors, by mesne assignments, to Ansor Corporation, New York, N.Y., a corporation of Delaware
Filed Aug. 3, 1962, Ser. No. 214,768
12 Claims. (Cl. 75—117)

This invention relates to a process for converting copper ions to metallic copper.

Many methods for extracting copper from ores are known. The most common of these is the smelting of sulfide ores to form crude impure copper metal directly. The copper metal is then electrolytically refined to produce pure copper. This process requires a very large investment in the capital equipment necessary to perform the smelting step, and the cost of using this process is also increased by the large amount of eelctricity needed for the refining step.

There are also several methods of wet extraction of copper from its ores. For example, copper ores may be treated with leaching agents such as sulfuric acid, ferric sulfate and the like, to dissolve the copper out of the ores. The copper sulfate so formed is then treated electrolytically to deposit the copper. These methods are costly due to the electricity necessary to reduce the copper ions to form metallic copper.

Accordingly, it is a primary object of this invention to provide a process for converting copper ions to metallic copper which is chemical in nature and requires neither large capital expenditures nor high operating costs.

It is a further object of this invention to provide a process for recovering metallic copper from copper sulfate.

It is another object of this invention to convert copper sulfate to metallic copper while producing ammonium sulfate as a by-product.

Briefly stated, a preferred form of the process of this invention involves starting with an aqueous solution of copper sulfate, treating this copper sulfate solution with ammonia to form the cupric ammonium sulfate complex, treating the cupric ammonium sulfate complex with sulfur dioxide to form a crystalline solid which is insoluble, and treating the said crystalline solid with sulfuric acid to produce metallic copper.

In an alternative embodiment, air or oxygen may be substituted for the sulfuric acid to form metallic copper from the crystalline solid.

The invention will be more readily understood when discussed in conjunction with the drawings in which.

Figure 1:
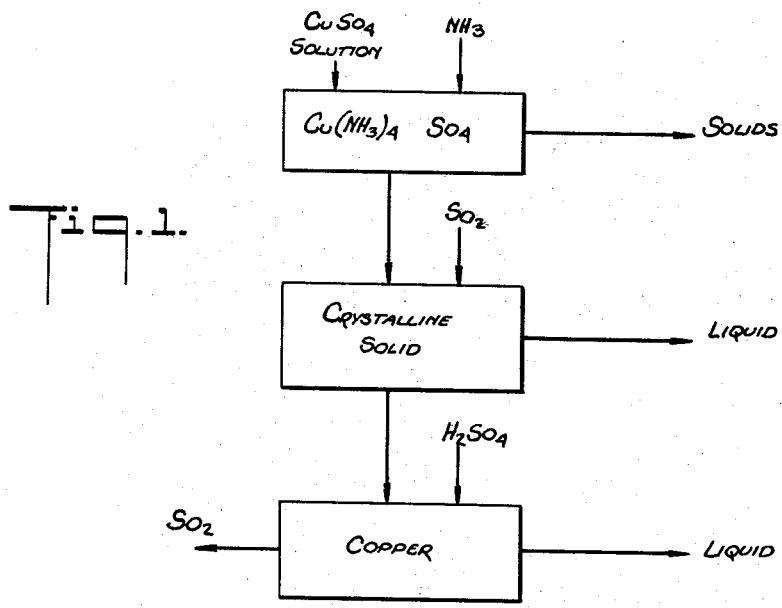
FIG. 1 is a flow sheet depicting the steps of a preferred form of the process of this invention.

With respect now more particularly to the drawings, FIG. 1 is a flow sheet depicting a preferred form of the process of this invention. The starting material for this process is an aqueous solution of copper sulfate. Such a solution may be obtained in a number of ways including leaching of copper ores, or roasting of sulfide copper ores followed by leaching.

The concentration of the copper sulfate starting solution is not critical. It may be as high as the solubility limit of copper sulfate in water or aqua ammonia, or it may be as low as 1% or less. It is, in fact, one of the advantages of this invention that the process may be used either to recover large amounts of copper from concentrated copper sulfate solutions or, alternatively, to remove small amounts or even traces of copper from aqueous solutions in which copper is actually a contaminant.

The first step in the process involves the addition of ammonia to form the cupric ammonium sulfate complex. As is well known, this complex has four moles of ammonia for each mole of copper. Thus, the stoichiometric amount of ammonia would be equal to four times the copper content of the aqueous solution.

It is preferable to add a slight excess of ammonia, on the order of 1%, to insure that all of the cupric ions present are in the form of the ammonia complex. For practical purposes, the excess ammonia may be in the approximate range of from 1% to 10%. Too large an excess is undesirable since it leads to an unwanted side reaction in the next step. However, an excess of ammonia will have no adverse effect on the process from the standpoint of copper removal, whereas a deficiency of ammonia will result in a loss of copper. Accordingly, if it is important to remove all of the copper, an excess should be used. It should be appreciated that the only effect that a deficiency of ammonia has on the process as a whole is that some of the copper will not be reduced in subsequent steps and will be removed with the by-product stream.

It is to be appreciated that the exact quantity of ammonia present in the solution may be determined by titration of the solution. Too large an excess of ammonia may be either stripped by bubbling air through the solution or compensated for by the addition of copper sulfate.

There is a commercial process in which copper ores are leached with ammoniacal solution. Accordingly, the liquor from such a leaching process is suitable for the purposes of this invention provided the ratio of copper to ammonia is adjusted to insure that all of the cupric ions present are in the form of cupric ammonium sulfate complex.

The step of adding ammonia is conveniently accomplished without the need of pressure vessels. Since the reaction to form the complex is exothermic and proceeds rapidly at ambient temperatures, there is no need to heat the solution. The ammonia may be added either as a gas or in an aqueous solution.

As shown in FIG. 1, copper sulfate solution and ammonia are reacted to form the cupric ammonium sulfate complex. At this point in the process, a filtration or decantation step is in order to remove any material which may have been precipitated by the addition of ammonia.

The next step in this process is the addition of sulfur dioxide to the cupric ammonium sulfate complex. The addition of sulfur dioxide causes a precipitate to form. The precipitated material is crystalline and contains virtually all of the copper which was originally present in the form of the copper complex. The crystals so produced are hexagonal in shape. The crystalline material contains equal mole quantities of copper, nitrogen, and sulfur.

The liquid remaining after removal of the insoluble precipitate is found to contain ammonium sulfate. The ammonium sulfate may be extracted from the liquor by any convenient method and is of a purity sufficient for use as a fertilizer or chemical intermediate where absolute purity is not essential.

At this point it can be appreciated that addition of substantial excess of ammonia in the previous step would result in the formation of ammonium sulfite. Since this material would tend to reduce the purity of the ammonium sulfate recoverable from the liquor, the presence of too large an excess ammonia is obviously undesirable.

Sufficient sulfur dioxide should be added to react with all of the copper complex. An excess of sulfur dioxide is to be avoided since the crystalline solid tends to dissolve in acidic solutions. Thus it can be seen that addition of less than the theoretical amount of sulfur dioxide will result in a copper loss because a portion of the copper complex will be left unconverted, and addition of more than the theoretical amount of sulfur dioxide will result in a copper loss since some of the crystalline precipitate will dissolve. This situation is reflected in the graph shown in FIG. 2.

Figure 2:
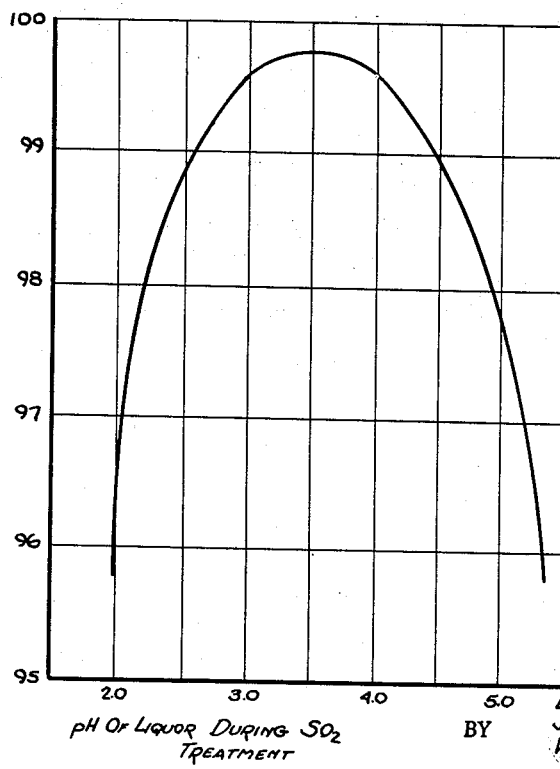
FIG. 2 is a graph depicting the relationship between recovery of copper and the pH of the solution during the sulfur dioxide addition.

FIG. 2 is a graph depicting copper recovery efficiency as a function of the pH of the solution during the sulfur dioxide addition step. The copper recovery is based on the losses of copper in the solution from which the precipitated crystalline solid is removed. Thus, as sulfur dioxide is added, the pH decreases. Starting from a pH of approximately 5.6 in the graph, the losses are 4%. As sulfur dioxide is added, the pH decreases and the copper losses decrease until an optimum is reached at a pH of approximately 3.5. This is the point at which substantially all of the copper complex has been converted to the insoluble crystalline material. Further additions of sulfur dioxide reduce the pH and, as shown in FIG. 2, this decrease in pH results in an increase in copper losses.

The optimum pH is dependent upon the amount of excess ammonia in the solution prior to the addition of sulfur dioxide. The optimum pH is lowered by increasing the excess of ammonia. However, this variation is minimal, and the graph of FIG. 2, which indicates the relationship for 7% excess ammonia, is considered representative. It has been determined that there is a visual method for determining the optimum sulfur dioxide addition for any amount of excess ammonia.

Before any addition of sulfur dioxide, the solution is a deep blue color due to the presence of the copper complex. As sulfur dioxide is introduced into the solution, the color changes from deep blue, to blue-green, to brown, to pink and then to colorless. Further addition of sulfur dioxide imparts a green color to the previously colorless solution. It has been determined that the disappearance of color from the solution is a very accurate indication of the presence of the theoretically desirable amount of sulfur dioxide. In other words, the optimum point, such as that shown at the pH of 3.5 in FIG. 2, is indicated by a colorless solution.

Thus, in order to minimize copper losses, sulfur dioxide is added to the solution until the solution goes from pink to colorless. The pH at the colorless end point will, in general, lie between approximately 3.0 and 5.0, depending upon the excess ammonia present. The colorless end-point is most pronounced in solution in which there was originally present an excess of ammonia of at least approximately 1%. As the excess of ammonia decreases below approximately 1%, the colorless end-point is more difficult to perceive. If ammonia was originally deficient, a colorless end-point can not be achieved, the solution at the optimum pH is greenish in color, and the minimum attainable copper loss will be higher than when an excess of ammonia is originally provided.

It is to be appreciated that this step, like the ammonia addition step, is exothermic and may be conducted under atmospheric pressure and at ambient temperature.

At this point the crystalline solid is recovered as a slurry by decanting the liquid. Any other convenient method of concentrating the solid is satisfactory. The liquid contains ammonium sulfate which is recovered as a valuable by-product.

It is to be noted that the insoluble crystalline material may be formed by addition of sulfur dioxide to copper sulfate followed by addition of ammonia, or by simultaneous addition of these two materials under proper control.

The last step of the process involves treating the crystalline precipitate with sulfuric acid. Such treatment results in the formation of metallic copper particles of high purity. Also formed in this reaction are copper sulfate, ammonium sulfate, and sulfur dioxide. As indicated in the examples below, chemical analysis of the copper particles showed a purity of better than 99%.

The sulfuric acid being added in the last step is preferably concentrated since this obviates the need for water removal in later steps. However, the actual concentration of the sulfuric acid is not critical. Thus, for example, sulfuric acid of a concentration of the order of 1% by weight is suitable for use. Likewise, there is no maximum concentration to which the process is limited. If a highly concentrated acid is used, sufficient water must be added to ensure that the sulfate salts formed in the reaction will not crystallize out.

As stated above, sulfur dioxide is one of the products of this last step. The evolution of sulfur dioxide is a convenient guide in determining when the reaction is completed. Accordingly, the addition of sulfuric acid is continued until there is no sulfur dioxide evolved from the mixture.

The addition of the sulfuric acid may be conducted at atmospheric pressure and ambient temperature. This reaction is highly exothermic.

The copper particles are recovered by filtration or decantation of the liquid. The particles are then washed with water to remove all traces of sulfate.

The liquid contains copper sulfate and ammonium sulfate, and in a continuous process, this liquid is recycled and added to the fresh copper sulfate in the first step.

The process described above may be modified by substituting oxygen for the sulfuric acid used to form the copper particles. The oxygen may be added by bubbling air, oxygen or any oxygen-enriched gas through the slurry of the insoluble crystalline solid. For this purpose, additional liquid, in the form of water, may be added to the slurry in order to facilitate the bubbling procedure.

It has been found that heating the reactants accelerates the rate of reaction during the oxygen addition to a level which is acceptable from a practical standpoint.

The products of this modification are: copper metal particles, cupric oxide particles, ammonium sulfate and sulfur dioxide. The copper is approximately equally divided between the metal and oxide forms.

Sulfuric acid is then added to the mixture. The sulfuric acid does not affect the copper metal but does react with the cupric oxide to form copper sulfate, which dissolves, thus leaving copper metal in the solid phase. One advantage of this modification is that the amount of sulfuric acid required for the overall process is reduced by approximately one half.

It is to be appreciated that the process of this invention can be used to produce ammonium sulfate by taking the insoluble crystalline material formed during the sulfur dioxide addition step, dissolving it in aqueous ammonia, bubbling air through the solution to form cupric ammonium sulfate, and then adding sulfur dioxide. As usual, the liquid, after the sulfur dioxide addition, contains ammonium sulfate and is withdrawn as a product. In this alternative procedure, copper is not removed from the process but is continually recycled.

Set forth below are several examples of the present invention.

*Example 1*

Cupric ammonium sulfate salt was prepared in the laboratory and this analyzed as follows: 27.0% copper, 21.5% nitrogen, and 12.8% sulfur, indicating a deficiency of ammonia with respect to the formula $Cu(NH_3)_4SO_4$.

100 grams of this salt were dissolved in 121.0 cc. of water. 15.3 cc. of aqueous ammonia (28% $NH_3$ by weight, specific gravity 0.890) were added to the solution to correct for the ammonia deficiency.

Sulfur dioxide gas was then bubbled through the resulting solution. The sulfur dioxide was in the form of a mixture of air and sulfur dioxide, the proportions of which were not determined. The bubbling was continued to give a color change from deep blue to green, to brown, to colorless.

A precipitate was formed during the sulfur dioxide bubbling. The solution was allowed to stand so that the precipitate collected at the bottom of the vessel. The clear solution was decanted leaving a slurry. The slurry was then filtered and the filtrate combined with the clear solution previously decanted. The total clear solution collected weighed 185.7 grams and analysed as follows: 0.319% copper, 8.10% nitrogen, and 9.55% sulfur. The wet filter cake collected weighed 87.9 grams and analyzed as follows: 29.4% copper, 8.22% nitrogen, and 16.55% sulfur.

20 grams of the wet filter cake were transferred into a beaker. 20 cc. of sulfuric acid solution (65.5% $H_2SO_4$ by weight, specific gravity 1.534) were then added to the filter cake. This resulted in the decomposition of the crystalline solids in the filter cake, accompanied by an evolution of sulfur dioxide gas and the precipitation of copper metal particles. The liquor was decanted and the copper particles were washed until no sulfate could be detected in the wash water, using the barium chloride test. 2.32 grams of copper metal were obtained. This indicated that 37.8% of the copper originally in the cupric ammonium sulfate feed was converted into metallic copper particles.

Copper particles subsequently produced as described above were tested by spectrographic analysis and were found not to contain any detectable impurities. Another sample similarly produced was analysed by standard procedures and resulted in 99.6% and 99.7% Cu in parallel replicates.

*Example 2*

Fifty (50.0) grams of cupric ammonium sulfate from the same batch prepared for Example 1 were dissolved in 70 cc. of water, and 7.9 cc. of aqueous ammonia (28% $NH_3$) were added to correct for the ammonia deficiency.

Sulfur dioxide gas was then bubbled through the solution. The sulfur dioxide was in a mixture with air at a concentration of 8.0 to 8.5% $SO_2$ by volume. The bubbling was continued until the pH of the solution was 5.6. At this point the color of the solution was a light green.

A precipitate was formed during the bubbling of the sulfur dioxide gas. The solution was allowed to stand, and the clear solution was decanted, leaving a slurry. The slurry was then filtered and the filtrate combined with the clear solution previously decanted.

The total clear solution collected weighed 179.9 grams, and this solution contained 0.0342% copper by weight. Of the total copper contained in the cupric ammonium sulfate feed amounting to 13.50 grams Cu, the amount remaining in solution was, therefore, 0.0615 gram Cu. This indicated a copper stripping efficiency of 99.54%.

The wet filter cake was collected, found to weigh 40.51 grams, and was transferred into a beaker. A little water was added to the filter cake to form a slurry.

Diluted sulfuric acid of undetermined concentration was added to the slurry. This resulted in the decomposition of the solids and an evolution of sulfur dioxide gas. The addition of sulfuric acid was continued while agitating the slurry until the evolution of the gas ceased. As this reaction proceeded, copper metal particles were precipitated.

The liquor was decanted and the copper particles were washed successively with water until no sulfates could be detected in the final wash water by a barium chloride test. All the wash water was collected together with the liquor originally decanted.

Standard copper determinations were then performed on the copper metal particles and the liquor. It was found that there were 6.48 grams of copper metal particles and 6.94 grams of copper in the liquor. This indicated that 48% of the copper originally in the cupric ammonium sulfate feed was converted into metallic copper particles.

*Example 3*

The procedure described in the foregoing examples was followed up to and including the filtration of the solids formed during the sulfur dioxide addition. The filter cake was washed with water to remove soluble sulfates.

The filter cake was then diluted by the addition of water to form a slurry, and oxygen was then bubbled therethrough while heating the slurry.

Sulfur dioxide gas was evolved during the passage of oxygen and was made to pass through a known quantity of iodine solution. The color of the slurry changed from the original light cream to a reddish brown.

The bubbling of oxygen and the addition of heat was continued until the evolution of sulfur dioxide ceased. It was observed that the original crystalline salt had decomposed as a result of the oxygen and heat addition. The solid particles in the reddish brown slurry were found to contain metallic copper and copper oxide.

The clear liquor was decanted and the solid particles were washed with water. The wash water was combined with the decanted liquor.

It was determined by back-titrating the iodine that the amount of sulfur dioxide evolved was 4.56 grams of $SO_2$. The liquor and wash water mixture contained 0.217 gram of copper, 2.20 grams of nitrogen, and 2.45 grams of total sulfur subdivided into 2.35 grams of sulfur in the sulfate form and 0.10 gram of sulfur in the sulfite form.

Dilute sulfuric acid was then added to the solid particles in an excess of that required to dissolve the copper oxide. The metal copper particles were not affected by this sulfuric acid addition. The liquid phase turned blue as a result of the reaction.

The blue liquid and the copper metal particles were then separated by decantation. The metal copper particles were washed with water, and the wash water combined with the decanted blue liquid.

By standard laboratory procedures, it was determined that there were 4.89 grams of copper in the metal form, and 5.27 grams of copper dissolved in the blue liquid.

What has been described above is a process for converting copper ions to metallic copper. Variations in the described process may be made by one skilled in the art without departing from the spirit and scope of this invention.

What is claimed is:

1. The process comprising the steps of providing an aqueous solution of copper sulfate, converting at least a portion of the copper sulfate in said solution to $$Cu(NH_3)_4SO_4$$

by reaction with ammonia, treating the $Cu(NH_3)_4SO_4$ so formed with sulfur dioxide to form a crystalline solid, and adding sulfuric acid to said crystalline solid to form metallic copper.

2. The process comprising the steps of providing an aqueous copper sulfate solution, treating said solution with ammonia to form $Cu(NH_3)_4SO_4$, said solution being treated to provide an excess of ammonia over the stoichiometric amount necessary to form $Cu(NH_3)_4SO_4$, treating the solution containing said $Cu(NH_3)_4SO_4$ with sulfur dioxide to form a crystalline solid, and treating said crystalline solid with sulfuric acid to form metallic copper.

3. The process of claim 2 in which the said excess of ammonia is in the range of approximately 1% to 10%.

4. The process of claim 2 in which said sulfur dioxide treatment renders said solution colorless.

5. The process of claim 2 in which said sulfur dioxide treatment results in a pH in said solution in the approximate range of from 3.0 to 5.0.

6. The process comprising the steps of providing an aqueous copper sulfate solution in which the copper sulfate is present in a concentration of at least 1% by weight, treating said solution with ammonia to form $$Cu(NH_3)SO_4$$

said treatment providing an excess of ammonia in the range of approximately 1% to 10% over the stoichiometric amount necessary to form $Cu(NH_3)_4SO_4$, treating the said solution with sulfur dioxide in a quantity sufficient to render said solution colorless, said sulfur dioxide treatment forming a crystalline solid, and treating said crystalline solid with sulfuric acid to form metallic copper.

7. The process comprising the steps of providing an aqueous solution of copper sulfate, converting at least a portion of the copper sulfate in said solution to $$Cu(NH_3)_4SO_4$$

by reaction with ammonia, treating the $Cu(NH_3)_4SO_4$ so formed with sulfur dioxide to form a crystalline solid, treating said crystalline solid with oxygen while heating to form metallic copper.

8. The process comprising the steps of providing an aqueous copper sulfate solution, treating said solution with ammonia to form $Cu(NH_3)_4SO_4$, said solution being treated to provide an excess of ammonia over the stoichiometric amount necessary to form $Cu(NH_3)_4SO_4$, treating the solution containing said $Cu(NH_3)_4SO_4$ with sulfur dioxide to form a crystalline solid, treating said crystalline solid with oxygen while heating to form metallic copper and cupric oxide, and treating the said copper and cupric oxide with sulfuric acid to dissolve the cupric oxide.

9. The process of claim 8 in which the said excess of ammonia is in the range of approximately 1% to 10%.

10. The process of claim 8 in which said sulfur dioxide treatment renders said solution colorless.

11. The process of claim 8 in which said sulfur dioxide treatment results in a pH in said solution in the approximate range of from 3.0 to 5.0.

12. The process comprising the steps of providing an aqueous copper sulfate solution in which the copper sulfate is present in a concentration of at least 1% by weight, treating said solution with ammonia to form $$Cu(NH_3)SO_4$$

said treatment providing an excess of ammonia in the range of approximately 1% to 10% over the stoichiometric amount necessary to form $Cu(NH_3)_4SO_4$, treating the said solution with sulfur dioxide in a quantity sufficient to render said solution colorless, said sulfur dioxide treatment forming a crystalline solid, treating said crystalline solid with oxygen while heating to form metallic copper and cupric oxide, and treating the said copper and cupric oxide with sulfuric acid to dissolve the cupric oxide.

References Cited in the file of this patent

Jacobson: Encyclopedia of Chemical Reactions, vol. III, Reinhold Publishing Corp., New York, 1949, pp. 390, 405 and 434.

Mellor: Comprehensive Treatise on Inorganic and Theoretical Chemistry, vol. III, Longmans, Green and Company, New York, 1923, pp. 251–256.

Greenawalt: Hydrometallurgy of Copper, McGraw-Hill Book Co., New York, 1912, page 179.